Patented Mar. 8, 1932

1,848,743

UNITED STATES PATENT OFFICE

CHARLES W. PARKS, OF WILMINGTON, LOS ANGELES, CALIFORNIA

PROCESS FOR PREPARING CLAY PRODUCTS

No Drawing. Application filed May 3, 1930. Serial No. 449,698.

This invention relates to a process for coloring clay products and relates more particularly to a process for coloring burnt clay products.

An object of the invention is to color clay products and a more definite object is to color burnt or heat treated clay products by exposing them to the influence of a vapor other than air.

As is well known at the present time, brick and other clay products are burned or heat treated in open or closed chambers with furnaces of some type as sources of heat. When the desired heat has been obtained, firing of the furnace is discontinued and the clay product is permitted to cool. This cooling heretofore has always been done in an atmosphere of air, this whether the furnace is closed or open.

According to this invention, after the clay products have been heated to the desired temperature, the heat is lessened or discontinued, the chamber in which the clay products are heated is closed and filled with gas, and the clay products are permitted to cool partially or completely in this atmosphere of gas. In the open type of chamber, the chamber would, of course, have to be closed off, or the clay products removed to a closed chamber into which a combustible gas may be admitted without combustion taking place.

It is not necessary to exhaust the air from the chamber into which the gas is admitted, since when the gas is admitted the oxygen content is substantially burnt out. The chamber containing the clay products is a closed one with a temperature sufficiently high to ignite a combustible mixture of gas and air, but by admitting the gas slowly, the oxygen content is exhausted before sufficient gas to constitute an explosive mixture is admitted.

According to this invention, the clay products may be cooled completely from their maximum temperature to atmospheric temperature in a combustible gas, or they may be cooled through any portion of this range of temperature. For example, the clay products may be heated to say 2000° F. They are permitted to cool to 1600° F. At this temperature, a combustible gas is admitted into the chamber, with air prevented from entering by keeping the gas pressure slightly higher than atmospheric pressure. The products are permitted to cool to say 1200° F. in the atmosphere of combustible gas, and then the gas may be discontinued and air admitted for the remainder of the cooling.

The range of temperatures through which the clay products should be cooled depends both upon their physical characteristics and upon the color effects desired.

Combustible gas may be produced within the heating chamber, according to this invention, by introducing a combustible fuel therein. For example, petroleum may be forced into the chamber, which, upon being heated by the walls and the clay products, forms a combustible gas which serves to color the clay products when cooled in its atmosphere.

After application of a combustible gas to the clay products, it may prove undesirable to continue its application once the desired effect is obtained. In order to discontinue the application of the combustible gas, and still retain its effect in part at least, an inert gas, such as carbon dioxide, to which there may or may not have been added a certain percentage of combustible gas, is admitted into the chamber so that the combustible gas therein is greatly diluted or forced out. The reason for the addition of combustible gas to the inert gas admitted into the heating chamber is to prevent any air excess, which is generally present, from becoming an oxidizing agent. With sufficient combustible gas present in the inert gases, the action on the clay products will still be reducing or neutral. After inert gas has been admitted, the clay products are cooled therein until upon exposure to air the products retain the desired colors.

By admitting inert gases with combustible gases, the danger of explosion is lessened, and the action of the combustible gases on the clay products may be controlled more exactly. It is to be understood, of course, that this invention comprehends complete or partial cooling in combustible gases, or complete or partial cooling in combustible gases diluted by an inert gas.

It is believed that any form of gas vapor containing combustible constituents may be used, according to this invention. Such gases are natural gas, coal gas, petroleum vapors and others.

It is to be understood that the invention is not limited to the methods disclosed in the foregoing description as other methods and applications may be practiced without departing from the spirit of the invention which is to be limited only by the scope of the annexed claims.

Having described my invention, what I claim as new and desire to secure by Letters Patent, is:

1. The method of coloring a clay product, which comprises, heating it in a chamber containing air, closing off said chamber, discontinuing the heat, and then introducing a combustible mixture into said chamber after the contents of the chamber have cooled below their maximum temperature but before the product has been completely cooled.

2. The method of coloring a clay product, which comprises, heating it in a chamber containing air, closing off said chamber and removing the oxygen content therefrom, discontinuing the heat, then introducing gas containing combustible constituents after the temperature falls to an appreciable extent but before the product has been completely cooled, and cooling said product in said gas.

3. The method of coloring a clay product, which comprises, heating it in a chamber containing oxygen, closing off said chamber, discontinuing the heat, permitting the chamber and its contents to cool below their maximum temperature, then introducing a combustible mixture before the product has been completely cooled, and then cooling said product in said combustible mixture.

4. The method of coloring a clay product, which comprises, heating it in a chamber containing air, closing off said chamber and removing the oxygen content therefrom, discontinuing the heat, introducing gas containing combustible constituents, and cooling said product in said gas until the desired effect is obtained, and then admitting an inert gas.

In testimony whereof I affix my signature.

CHARLES W. PARKS.